United States Patent [19]

Mikawa et al.

[11] Patent Number: 5,307,221

[45] Date of Patent: Apr. 26, 1994

[54] TAPE RECORDER MODE SWITCH

[75] Inventors: Akira Mikawa; Masao Kamijo, both of Tokyo, Japan

[73] Assignee: Kabushiki Kaisha Sankyo Seiki Seisakusho, Nagano, Japan

[21] Appl. No.: 931,921

[22] Filed: Aug. 18, 1992

Related U.S. Application Data

[63] Continuation-in-part of Ser. No. 572,389, Aug. 27, 1990, abandoned.

[30] Foreign Application Priority Data

Sep. 4, 1989 [JP] Japan .................................. 1-103106

[51] Int. Cl.⁵ ...................... G11B 15/18; G11B 5/008
[52] U.S. Cl. .................... 360/96.3; 360/105; 360/137
[58] Field of Search ................. 360/93, 96.3, 105, 137

[56] References Cited

U.S. PATENT DOCUMENTS

| | | | |
|---|---|---|---|
| 4,360,846 | 11/1982 | Asai et al. | 360/137 |
| 4,495,535 | 1/1985 | Kohri et al. | 360/96.3 |
| 4,547,823 | 10/1985 | Ri et al. | 360/90 |
| 4,674,001 | 6/1987 | Takahashi et al. | 360/137 |
| 4,720,755 | 1/1988 | Kamijo | 360/96.3 |
| 4,760,479 | 7/1988 | Suzuki et al. | 360/105 |
| 4,791,505 | 12/1988 | Takai et al. | 360/137 |
| 4,896,234 | 1/1990 | Watanabe et al. | 360/105 |
| 4,925,127 | 5/1990 | Outou et al. | 360/96.3 |
| 4,956,734 | 9/1990 | Kamijo | 360/105 |
| 5,031,471 | 7/1991 | Watanabe | 360/137 |
| 5,062,013 | 10/1991 | Gotoh | 360/96.3 |

FOREIGN PATENT DOCUMENTS

| | | |
|---|---|---|
| 61-133071 | 6/1986 | Japan . |
| 64-7475 | 2/1989 | Japan . |
| 64-7476 | 2/1989 | Japan . |

Primary Examiner—Stuart S. Levy
Assistant Examiner—Jefferson Evans
Attorney, Agent, or Firm—Jones, Tullar & Cooper

[57] ABSTRACT

A tape recorder used in a telephone message recorder, etc. includes a mode switching mechanism which switches over electrically between various working modes. The mechanism utilizes the operation of one solenoid and the rotational force of a motor, in which the operation of the solenoid is used as a trigger for the mode switching over and the sliding of a head base plate and gear switching are effected by the rotational force obtained through an assist gear.

2 Claims, 12 Drawing Sheets

TAPE RECORDER MODE SWITCH

This is a continuation-in-part of application Ser. No. 07/572,389, filed Aug. 27, 1990, now abandoned.

FIELD OF THE INVENTION

The present invention relates to a tape recorder, and more particularly, to a mode a switching mechanism for a tape recorder. The mechanism of the present invention switches electrically between different working modes of the recorder, utilizing the operation of a solenoid and the rotational force of a motor. At least three fundamental working modes are provided in the tape recorder, including record/playback, forward, and re-wind.

BACKGROUND OF THE INVENTION

Remotely controlled tape recorders used, for example, in a telephone message recorder, are generally provided with a mechanism which switches the recorder electrically between its different modes of operation. For example, in one known tape recorder, the magnetic head is displaced directly by a solenoid while the recorder is in the record/playback mode, whereas the switching between its fast forward mode and its re-wind mode is effected by changing the rotational direction of the motor. In such a recorder, the magnetic head is continuously attracted by the solenoid. However, a solenoid which is sufficiently powerful to directly drive the magnetic head is expensive and must be large, with the result that the electric power consumption is great. Furthermore, a reversible motor which can be switched to rotate in two directions requires complicated controls and is expensive. For this reason, it is difficult to reduce the size of such tape recorders and to lower their cost.

SUMMARY OF THE INVENTION

An object of the present invention is to provide a tape recorder having a solenoid which is reduced in size from conventional recorders. A further object of the invention is to provide a tape recorder which has a lower power consumption by reason of the fact that it utilizes a drive motor which rotates in only one direction and wherein the duration of the current conduction during mode switch over is kept constant.

In accordance with the present invention, an attractive solenoid and an assist gear engaged with a capstan gear driven by a motor are utilized, wherein the energization of the solenoid is utilized as a trigger. A cam portion is formed on an assist gear so that a head base plate, on which the magnetic head is mounted, can be selectively located at a stop position, at a playback/fast re-wind and erase position, and at an intermediate position between the two preceding positions, the head base plate being positioned by the cam portion. A slider plate, which controls a driving gear transmitting the rotation of the motor to each of the recorder reels, is driven by the solenoid. The head base plate is cyclically switched by suitable selection and control means by way of the solenoid to sequential positions. Such cyclical switching may shift the recorder from a stop mode to a playback mode to a fast forward mode and back to the stop mode, or may be cyclically switched sequentially from a stop mode to a fast re-wind and erase mode, to a re-wind mode and then to a stop mode. By this method, the mode switching of the recorder is effected by causing pulses having different pulse widths to flow through the solenoid which controls the movement of the drive gear and which transmits the rotation of the motor to the different tape reels.

In the case where the mode switch-over is executed by using an attractive solenoid, and by changing the duration of the attraction and the attraction timing by using properly long and short current conduction pulses, it is possible to control the duration of the current conduction at the mode-switch-over. However, since the attractive force varies, accompanied by variations in the stroke of the solenoid, it is difficult also to set the stroke. Furthermore, the attractive solenoid has problems, in that its current consumption is great, and that metallic noise at the attraction is great. In addition, it has another problem in that, at the mode switching-over, it is not possible to switch-over from one mode directly to another; for example, to a fast forward mode without first passing through a certain working mode; e.g. a playback mode.

In order to achieve the above objects, a tape recorder according to the present invention comprises a solenoid and a trigger arm controlled to be pivoted by the solenoid. An assist gear having a first cam portion is controlled to be rotated by the trigger arm and to displace a head base plate on which a magnetic head is mounted. A second cam portion on the assist gear displaces a first mode selection lever to predetermined positions which correspond to various modes. The mode selection lever is thereby engaged selectively with a driving gear rotated in unity with a rotating body rotated by the driving motor. A second lever having a stopping portion, and whose rotation is regulated by the trigger arm, is linked with the first lever and is held in a neutral position through an elastic body. The second lever is rotatable by an amount greater than the rotational amount of the first lever, and supports a mode switching gear which is movable to positions corresponding to a plurality of modes. The recorder also includes means for displacing the second lever to the positions corresponding to the plurality of modes and holding the second lever at those positions.

In operation, the solenoid is driven by a pulse to rotate the assist gear and to thereby rotate the first lever to a predetermined mode selecting position for mode selection. Thereafter, the solenoid is driven again to cause the second lever to engage with the trigger arm and to thereby rotate the second lever to the positions corresponding to the plurality of modes, in order to set the desired mode. The assist gear is engaged with the driving gear by means of constant pulses of a current which is so small that it is sufficient only to drive the trigger arm. The timing of the trigger arm motion which determines the position of the second lever for setting the mode, is varied by varying the interval of conduction between current pulses.

Accordingly, the mode switching over method for a tape recorder according to the present invention is characterized in that the tape recorder includes a latching solenoid for setting different modes of the recorder. Control of movement of a member for switching-over to fast forward and to re-winding modes, as well as control of the forwarding of a head base plate are effected by driving the latching solenoid a second time in the course of switching over from a stop mode to a play mode. In addition, selective setting of a fast forward mode, a re-winding mode, and a play back is effected by differences in driving timing of the latching solenoid.

BRIEF DESCRIPTION OF THE DRAWINGS

The foregoing, and additional objects, features and advantages of the present invention will become apparent to those of skill in the art from a consideration of the following detailed description of preferred embodiments thereof, taken in conjunction with the accompanying drawings, in which.

DETAILED DESCRIPTION OF PREFERRED EMBODIMENTS

Figure 1:
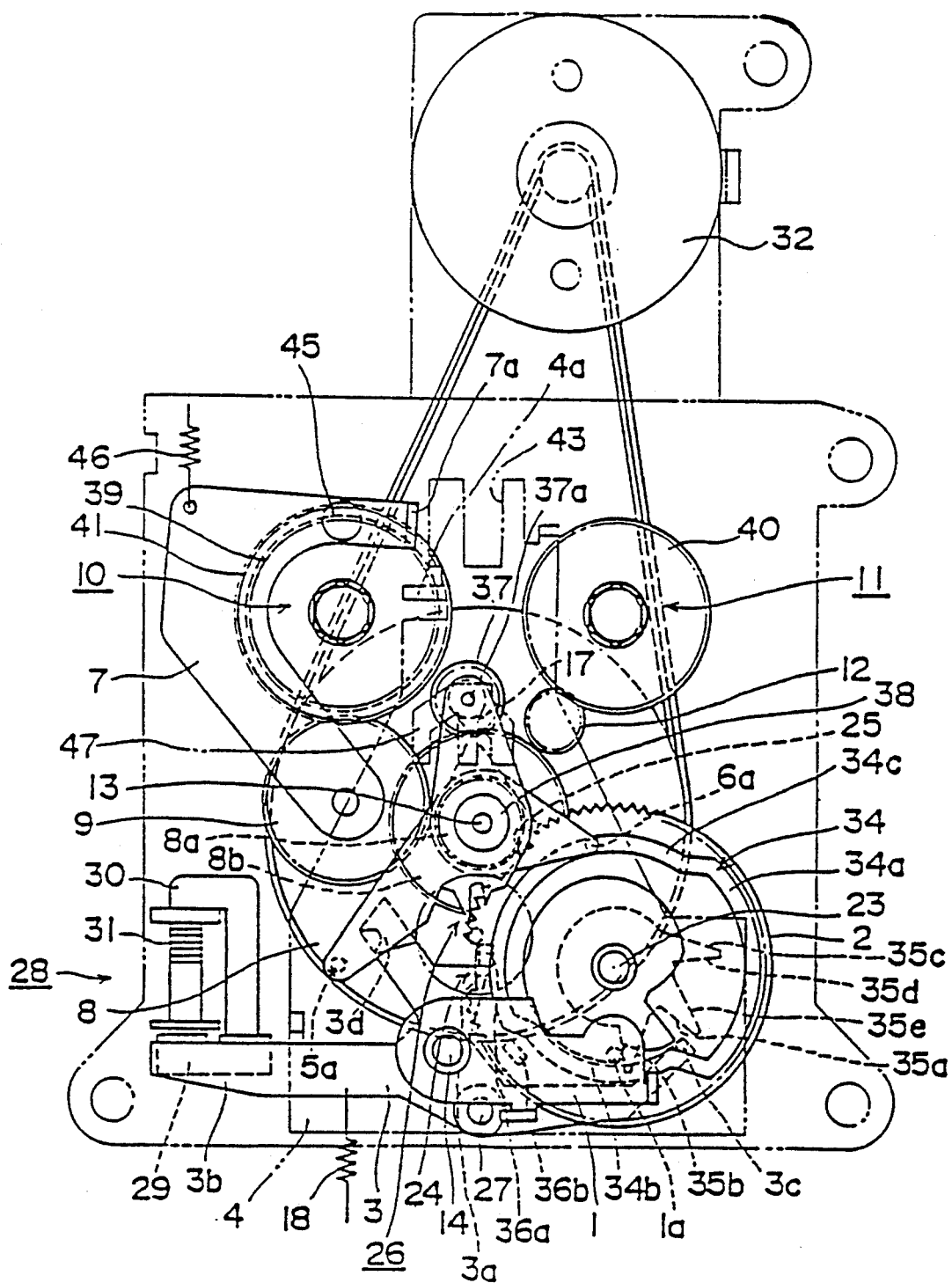
FIGS. 1 to 4 are schemes showing an example of the mechanism of a tape recorder according to the present invention, omitting the chassis, FIG. 1 indicating the mechanism in the stop state, FIG. 2 in the fast forward state, FIG. 3 in the re-wind state, and FIG. 4 in the playback recording state.

FIGS. 1 to 9 show a first embodiment of the tape recorder to which the mode switching method according to the present invention is applied. In this embodiment, a fast forward and re-winding switching member is moved by the action of a mode selecting assist cam linked with another assist cam. The mode selecting cam is positioned at a selected set mode position by controlling a trigger arm by means of a latching solenoid which drives the trigger arm with a timing sequence corresponding to the set mode. For example, the tape recorder mechanism of the present invention comprises at least a latching solenoid 28 and a trigger arm 3 which is controlled so as to be pivoted by the latching solenoid 28. A head base plate 4, on which a magnetic head 19, etc., are mounted, is slidably mounted on the recorder mechanism support plate. A head base plate sliding assist cam 33 (FIGS. 5 and 6) is a first cam portion which is controlled by the trigger arm 3 for displacing the head base plate 4. A mode selecting assist cam 34, which is a second cam portion, moves a rotatable tension FR arm 6 which is a first lever constituting a part of a mode selecting fast forward and re-winding switching member. Cam 34 moves arm 6 to a position corresponding to each set mode. An assist gear 2 (FIGS. 5 and 6) is engaged selectively with a driving gear; for example, flywheel gear 8a which is unitary with a rotating body such as flywheel 8 which, in turn, is rotated by drive motor 32 (FIG. 1). The assist gear is engaged with the driving gear by using the latching solenoid 28 as a trigger. An FR arm 5 (FIG. 5) supports a mode switching FR gear 37 to move it to a position corresponding to the set mode by rotation regulated by the trigger arm 3 and by rotation linked with the tension FR arm 6. A cut-off groove in the mechanism support plate serves as a means for fixing the FR arm 5 at a position corresponding to each set mode.

The FR arm 5 is a second lever having a stopping portion, e.g., a pin 5a at one end, and supports the mode switching gear 37 at its opposite end. Arm 5 is linked with the tension FR arm 6 and is held in a neutral position through a neutral spring 17, which is an elastic body. Arm 5 is rotatable by an amount greater than the rotational amount of the tension FR arm 6, and is rotatable to positions corresponding to a plurality of modes, as noted above. The tape recorder is so constructed that mode setting is effected by pulse-driving the latching solenoid 28 so as to rotate the assist gear 2 and to move the head base plate 4 and by again driving the latching solenoid 28 when the mode selecting tension FR arm is rotated to the selected set mode position.

Considering the mechanism in further detail, an assist arm (FIG. 1) is disposed for the purpose of displacing the head base plate 4 toward a capstan shaft 13, which is formed unitarily with the flywheel 8. The assist arm 1 is operated by the rotation of the assist cam 33 for sliding the head base plate. Arm 1 is disposed rotatably around a fixed shaft 14 on the head base plate 4 and is energized toward the stop position (FIG. 1) by a return torsion coil spring 15. On the free end of the assist arm 1 is an assist pin 1a which moves on the head base plate sliding assist cam 33 (located on assist gear 2), following the contour thereof. Further, the assist arm 1 and the head base plate 4 are both energized toward the STOP position by a return torsion spring 16.

The assist gear 2 is used as the driving source effecting the slide of the head base plate 4 and the switching-over of gears (mode switching-over) using the rotational force provided by the motor 32. Gear 2 has a cut-off toothed portion 24, best seen in FIGS. 5 and 6, which is opposite to the flywheel gear 8a at each of the playback/record, fast forward and re-wind modes. Gear 2 also has a cut-off toothed portion 25 (see FIG. 6) which is opposite to the flywheel gear 8a at the STOP mode, as illustrated in FIG. 1. Gear 2 is rotated only when it is engaged with the flywheel gear 8a, the gear rotating around a shaft 23 secured to a recorder frame, or chassis 22. In the case of the present embodiment, assist gear 2 incorporates an assist cam 34 (FIG. 5) for mode selection driving of the tension FR arm 6 as well as the head base plate sliding assist cam 33 which drives the assist arm 1, as explained above. Cams 34 and 35 are located on one web face of gear 2. The other web face of the gear includes an assist cam 35 for the trigger arm which drives the trigger arm 3 and protrusions 36a and 36b fixing the assist gear to between the trigger arm 3 and the assist cams, the cams on the web faces of gear 2 being formed unitarily therewith.

The mode selecting assist cam 34 is a ring-shaped front face cam consisting of a portion 34a which operates through the tension FR arm 6 to displace FR gear 37, carried by arm 5, toward an FF gear 39 mounted on the side of a take up reel 10. A portion 34b of cam 34 displaces the tension FR arm 6 in a direction to move arm 5 and thus FR gear 37 in the opposite direction, towards an REW gear 12 (see FIG. 6) which engages the side of the supply reel 11. A portion 34c of assist cam 34 displaces tension FR arm 6 so as to move the FR gear 37 toward its neutral position.

The head base plate assist cam 33 is disposed for the purpose of sending the magnetic head 19, carried by base plate 4, and a pinch roller 20 to their predetermined positions by displacing the assist arm 1 when the assist cam 34 is positioned to shift the gear 37 to the playback-/record position. Cam 33 has a portion 33a which gives the greatest displacement of assist arm 1 when the cut-off toothed portion 24 of the assist gear 2 is opposite to the flywheel gear 8a. Cam 33 has a STOP portion 33b for returning the head base plate to its initial STOP position and to stabilize it there.

The assist cam 35 (FIG. 6) for the trigger arm 3 is a cam member incorporating three protrusions. A first protrusion has a cam face 35a which may be engaged by the end 3c of the trigger arm 3 when the trigger arm is thrust away from the latch solenoid 28. When the flywheel gear 8a is opposite to the cut-off toothed portion 25 of the assist gear 2, motion of the trigger arm to give the cam 35 a slight forward rotation will cause the gear 2 to engage the flywheel gear 8a, so that the flywheel can then drive the assist gear 2. A second protrusion on cam 35 includes a cam face 35b for the re-set mode and a third protrusion includes a resetting cam face 35c. A cam face 35d on the third protrusion gives a slight forward motion in rotation to cause the assist gear 2 to engage the flywheel 8a when the flywheel gear 8a is opposite to the cut-off tooth portion 24. A cam face 35e on the first protrusion is for the re-set.

Cams 33, 34 and 35 are not necessarily made in one body with the assist 2, but it is sufficient if they are in a relation to the assist gear that they are coaxial thereto and rotated together therewith.

The head base plate 4 is a member on which the magnetic head 19 and the pinch roller 20 are mounted, keeping them slidable towards the capstan shaft 13 and toward a tape (not shown in the Figures) on the chassis 22. The two sides of this head base plate 4 are held by a guide 42 (FIG. 7), forming by cutting a part of the chassis 22 to bend it upwardly. The base plate 4 is guided in its slidable motion by engaging a guide roller 44 in a grooved portion 43 formed at the upper end of plate 4, as viewed in FIG. 7. Further, one end of the head base plate 4 is bent at a right angle and inserted into a hole formed at a corner of the chassis 22 so as to regulate the position of plate 4. Furthermore, a cut-off groove 47 is formed in the head base plate, groove 47 having three grooves for guiding the FR gear 37 as it pivots around a sleeve 38, which is coaxial to the capstan shaft 13, the gear 37 pivoting between the take-up (T) reel 10 side and the supply (S) reel 11 side. Gear 37 moves to the re-wind position (right), the fast forward position (left) and the playback position (center) in the groove 47 so that the groove stabilizes the motion of the gear.

Solenoid 28 is a latch solenoid which consists of an iron core formed in a U-shape, a coil 31 wound around the core 30, and a movable piece which is magnet 29 and which is brought into contact with the free end surfaces of the iron core 30. The magnet 29 is buried in one end 3b of the trigger arm 3 and is magnetized so that magnetic poles different from each appear in the portions which are opposite to the two free end surfaces of the iron core 30. The magnet is disposed so that the same magnetic pole is produced at each of the end surfaces of the iron core which is opposite thereto, when an electric current is made to flow through the coil 31, and thus it is thrust away from the iron core 30. When no electric current flows through this latch solenoid 28, the magnet is attracted by the iron core 30. Consequently, the attractive force of magnet 29 is so established that it is smaller than the magnetic force produced in the iron core 30 when an electric current is made to flow through coil 31.

The FR arm 5 and the tension FR arm 6 are mounted rotatably on the capstan shaft 13, which is coaxial to the flywheel gears 8a and 8b, so that they are not restricted by each other and they can be freely rotated and linked with each other by the neutral spring 17. Consequently, unless an external force acts on the FR arm 5, when the FR tension arm 6 is rotated, the FR arm 5 will also be rotated. On the other hand, in the case where an external force acts on the FR arm 5, movement of the FR tension arm 6 is absorbed by the neutral spring 17 and is not transmitted to the FR arm 5.

The trigger arm 3 is rotated around the shaft 27 on the chassis 22, and it has a portion 3a which engages and regulates the protrusions 36a and 36b of the assist gear 2. The trigger arm also includes a portion 3b which receives the magnet 29, and includes a portion 3d which selectively engages pin 5a on FR arm 5. The motion of portion 3d is controlled by pin 3c following the cam surface of the assist cam 35 which also controls the trigger arm of the assist gear 2 and the FR arm 6. Arm 3 is urged by a spring 18 in the direction opposite to the attraction by solenoid 28. Further, the force of this spring 18 is set so that it is smaller than the force with which the magnet 28 is attracted by the iron core 30 when no electric current flows through the solenoid 28. The FR arm 5 is rotated around the sleeve 38, which is coaxial to the flywheel 8 and is supported so that the FR gear 37 is always engaged with the flywheel gear 8b. The gear 37 has a diameter for increasing this speed and can be turned on its axis while being moved around the flywheel gear 8b. A regulating groove 26 is formed on FR arm 5 and temporarily fixes the arm 5 at the positions corresponding to the various modes of playback-/record, fast forward, and re-wind. A pin 5a on arm 5 is a stopping portion which is engaged by portion 3d (the FR arm select portion) of the trigger arm 3 to prevent rotation of the arm 5. A pin 21 on the head base 4 is coaxial to pinch roller 20 and is arranged to engage the regulating groove 26. Groove 26 includes an inclined face 26a which engages the pin 21 at the fast forward mode. It also includes an inclined face 26b which contacts the pin 21 at the rewind mode and a recess which the pin enters at the playback/record mode. Further, a driven pin 6a, which engages the gear shift assist cam 34 on the assist gear 2, is disposed on the tension FR arm 6. Arm 6 is disposed rotatably under the FR arm 5 and is coaxial therewith, and is rotated according to the displacement given it by the cam 34. Further, the FR arm 5 and the tension FR arm 6 are linked through the neutral spring 17 which transmits the movement of the tension FR arm 6 to the FR arm 5, again through the neutral spring 17. The neutral spring 17 acts to keep the tension FR arm 6 and the FR arm 5 in a predetermined angular relationship. When the FR arm 5 is operated by applying an external force to it, independently of the tension FR arm 6, the neutral spring 17 acts so that the tension FR arm 6 and the FR arm 5 return thereafter to the predetermined set angular relationship described above.

A play arm 7 is disposed for rotatable motion around a fulcrum 45 on the chassis 22 and is energized by a spring 46 in a counterclockwise direction, as viewed in FIG. 1. Rotation in this counter-clockwise direction separates an idler gear 9, mounted on the free end of arm 7, from the flywheel gear 8a. The idler 9 is engaged simultaneously with a play gear on the T reel 10 side, and the flywheel gear 8a. On the end of the play arm 7 opposite to the location of the idler gear is formed an engaging piece 7a which will engage with a corresponding engaging piece 4a on the head base plate 4. The engaging piece 4a is set so that the play arm 7 can be fixed with the idler gear 9 engaged with the flywheel gear 8a.

The T reel 10, the S reel 11, and the REW gear 12 (FIG. 1) are mounted rotatably on the chassis 22. The REW gear 12 and the gear 40 on the S reel 11 side are always engaged with each other. Further, the gear for the T reel has a two-step structure; that is, a gear 41 for play and a gear 39 for fast forward (FF), which requires separate torque mechanisms.

Figure 2:
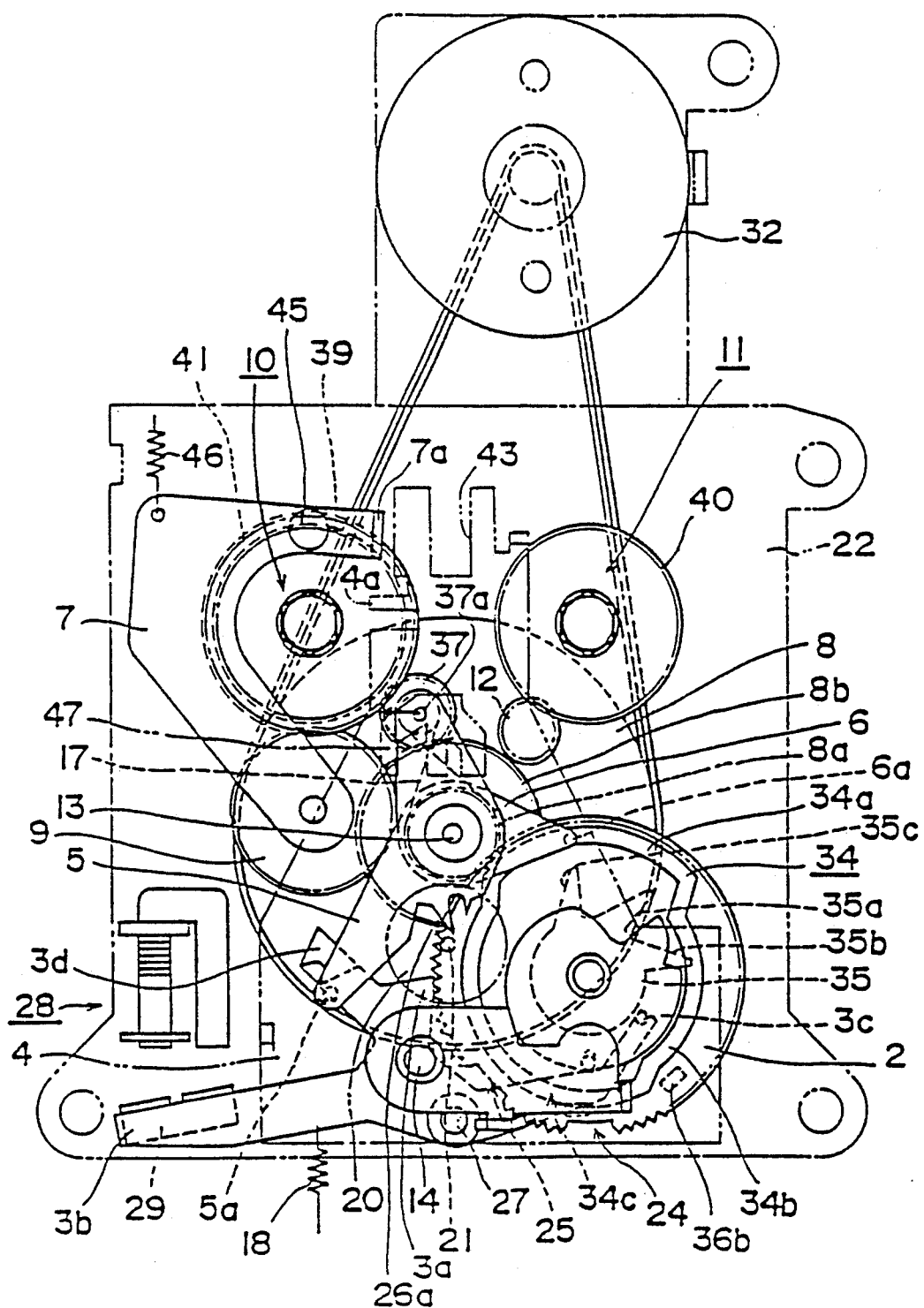

The tape recorder constructed as described above effects mode switching as follows:

Fast Forward (FIG. 1 to FIG. 2: Refer to FIG. 9B)

Accompanied by the selection of the fast forward mode, a pulse $P_1$ is made to flow through the latch solenoid 28. In this way, the trigger arm 3 is thrust away from the solenoid 28 and is rotated in a counterclockwise direction (as viewed in FIG. 1) around the shaft 27 which is fixed on the chassis 22. The trigger arm is moved by the force of spring 18 so that the pin 3c, mounted on the extremity of trigger arm 3 engages the cam face 35a of the assist cam 35 to urge the cam face 35a in a counterclockwise direction. In this way, the assist gear 2, whose cut-off toothed portion 25 has been opposite to the flywheel gear 8a, is rotated slightly counterclockwise so as to be engaged with the flywheel gear 8a. As the rotation of the assist gear 2 advances, the trigger arm 3 is rotated clockwise around the shaft 27 by the succeeding cam face 35b of the assist cam 35 so as to return the trigger arm to its initial position. As the rotation of the assist gear 2 advances further, the tension FR arm 6 is driven by the assist cam 34 for the mode selection, and the FR gear 37 supported by the FR arm 5 is energized towards the T reel 10 side.

When a predetermined period of time a has lapsed after the pulse $P_1$, the trigger arm is again thrust away from the latch solenoid 28 by a second pulse $P_2$ which flows through the solenoid 28 so as to rotate the trigger arm counterclockwise. The pin 5a of the FR arm 5 is received by the FR arm selecting portion 3d and this keeps the FR arm 5 in this state, regardless of further rotation of the assist gear 2. That is, even if the pin 6a is located at the REW cam position 34b, towards which the tension FR arm 6 is rotated, the FR arm 5 cannot rotate while it is held in contact with the FR arm selecting portion 3d, and this keeps it in that state. As the rotation of the assist gear 2 advances further, the pin 1a of the assist arm 1 is displaced counterclockwise, following the contour of the head base sliding assist cam 33. Since the shaft 14 side of the assist arm 1 always gives the pin 1a a clockwise rotational force, the cam 33 causes the head base plate 4 to slide upwardly towards the capstan shaft 13. This displaces the pinch roller on the head base plate 4 in the same direction along which is thrust on the capstan shaft 13. At the same time, the pin 21, which is coaxial with the pinch roller 20, is brought into contact with the inclined face 26a of the regulating groove 26 on the FR arm 5 so as to engage the FR gear 37 with the gear 39 for the reel 10 on the T side. At this time, since the movement of the pin 21 is regulated by the inclined face 26a, the pinch roller 20 and the capstan shaft 13 are not in contact with each other and are stopped at the FF position. Further, the shaft 37a of the FR gear 37 is inserted in a groove close to the T reel of the cut-off-groove 47 and is supported there. Then, the trigger arm 3 is returned to its initial position by the cam face 35c of the assist cam 35. In this state, the first cut-off toothed portion 24 of the assist gear 2 is positioned so as to be opposite to the flywheel gear 8a, and the engagement between gear 2 and the flywheel gear 8a is removed. The mechanism is so constructed that the head base plate sliding assist cam can be rotated no further. At the same time, the regulating portion 3a of the trigger arm in the reset state, and one of the protrusions 36b of the assist gear 2 are engaged with each other so as to lock the counterclockwise movement of the assist gear.

Figure 3:
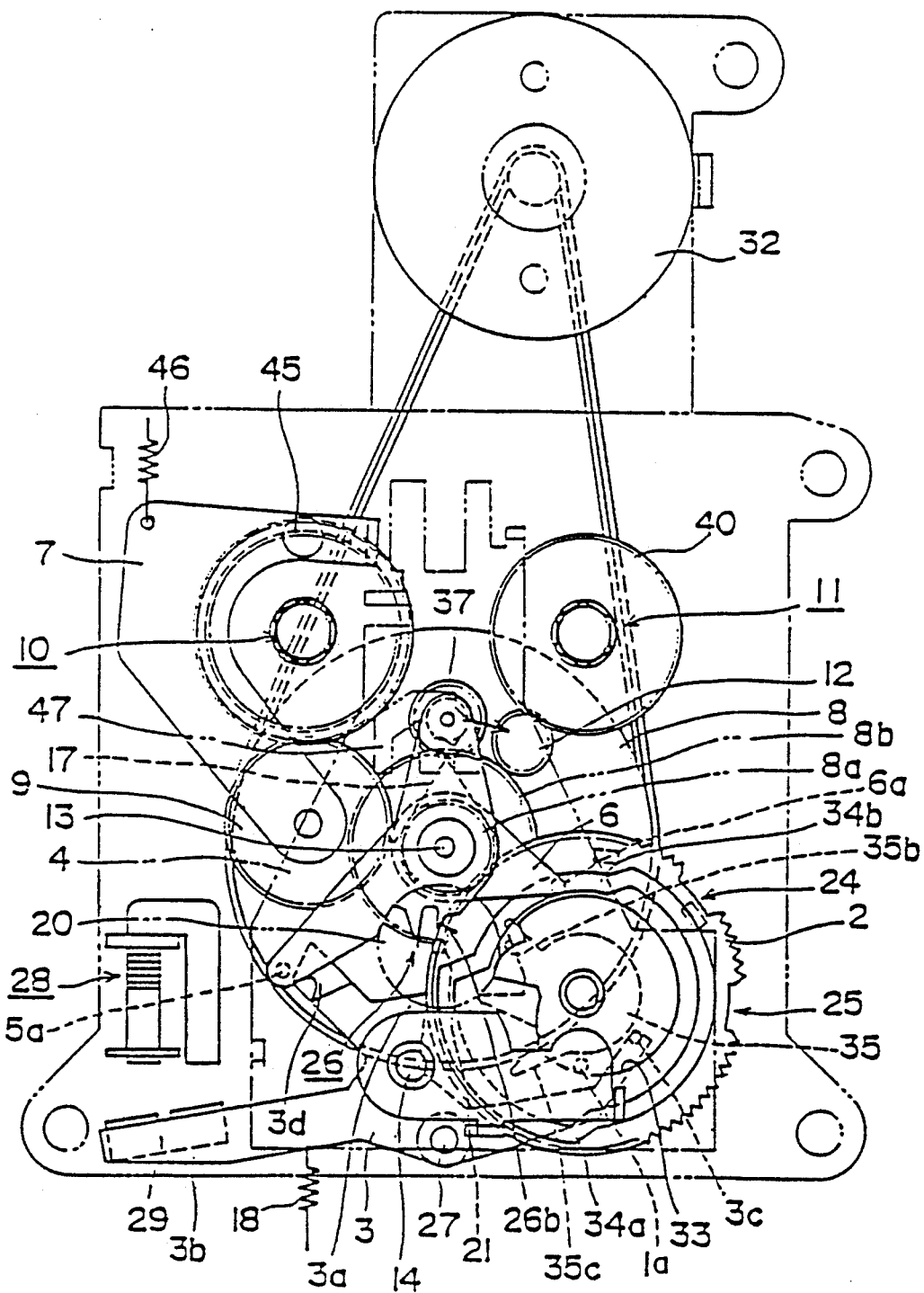
Figure 4:
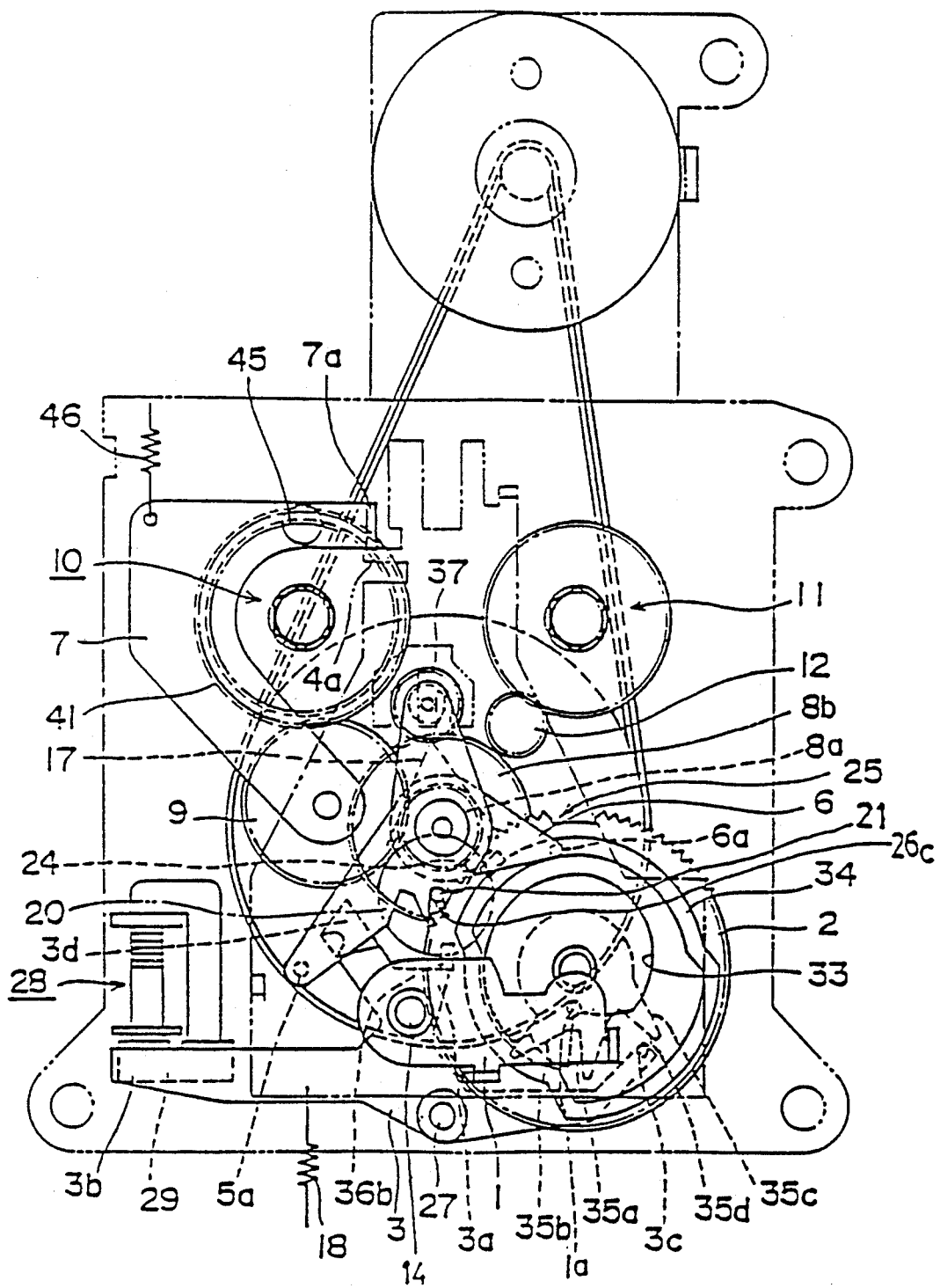
Figure 5:
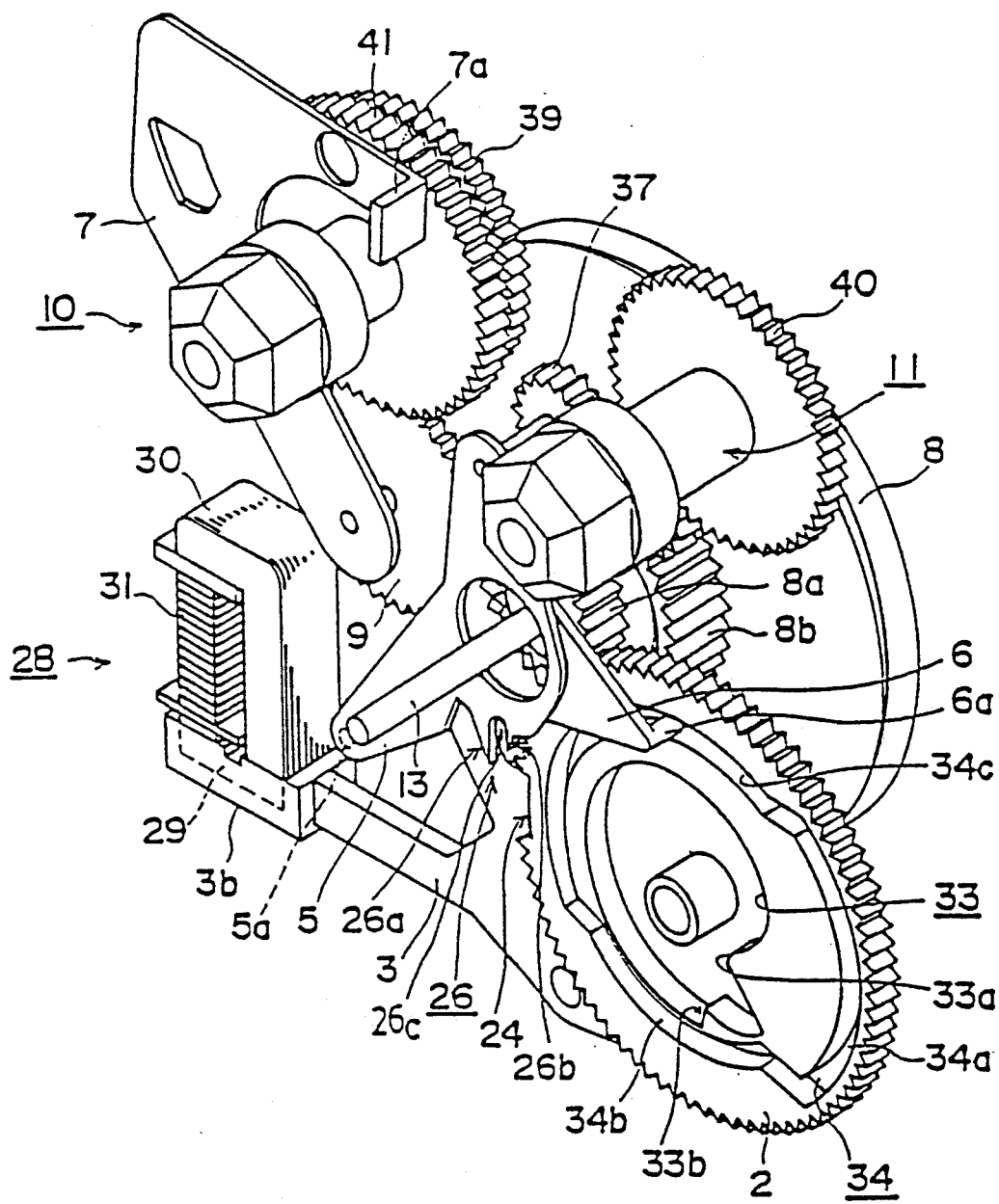
FIG. 5 is a perspective view of the mechanism, from which the head base plate also is removed.
Figure 6:
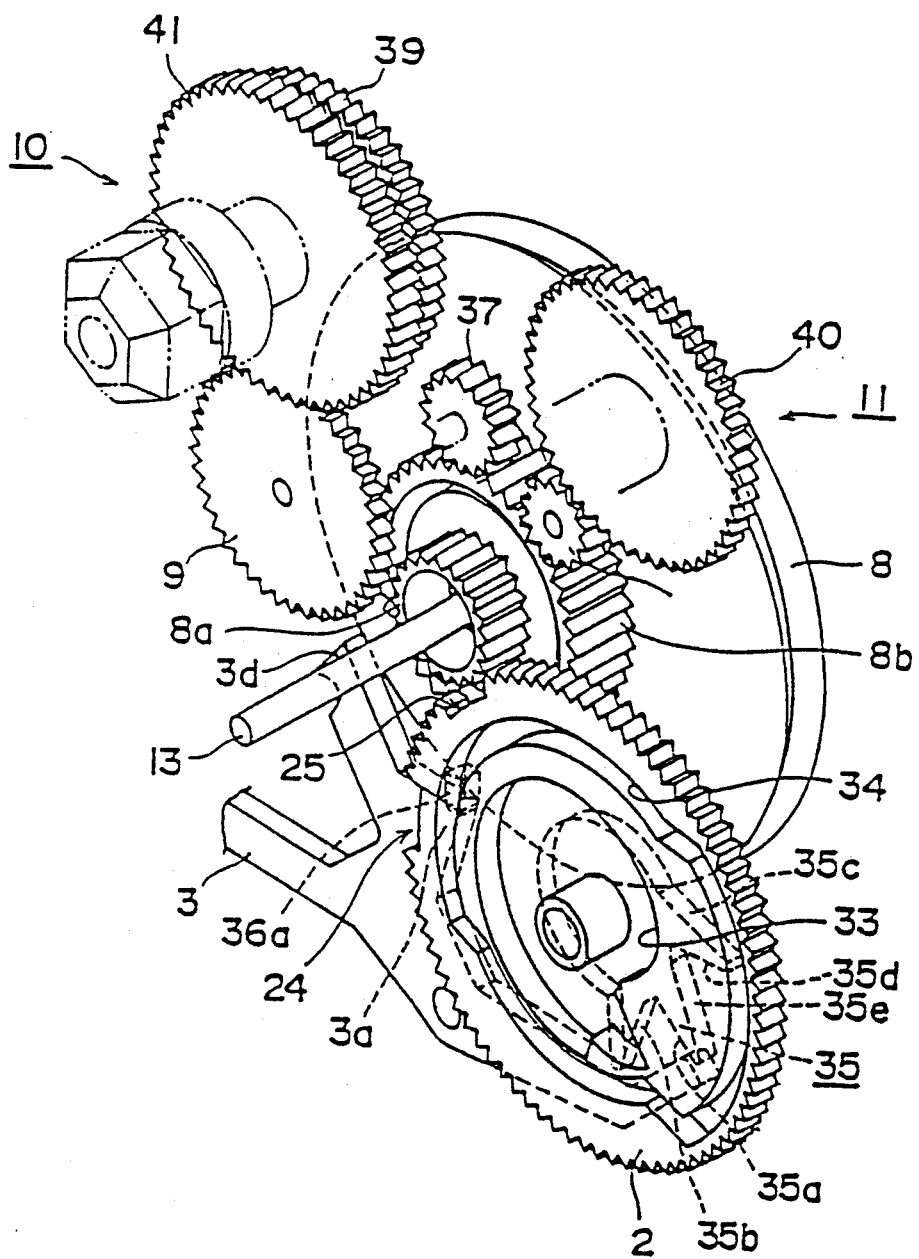
FIG. 6 is a perspective view of a gear train.
Figure 7:
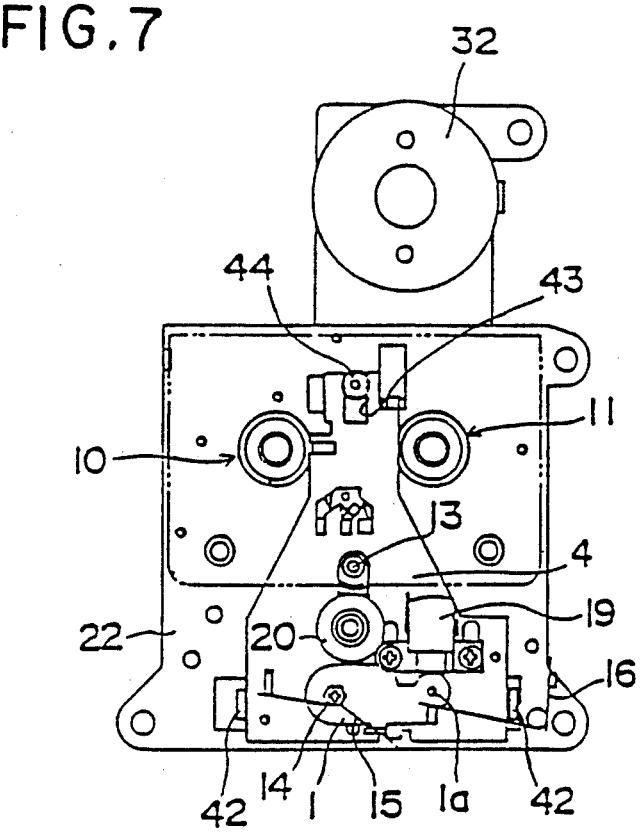
FIG. 7 is a plan view showing the outline of the structure of the tape recorder according to the present invention.
Figure 8:
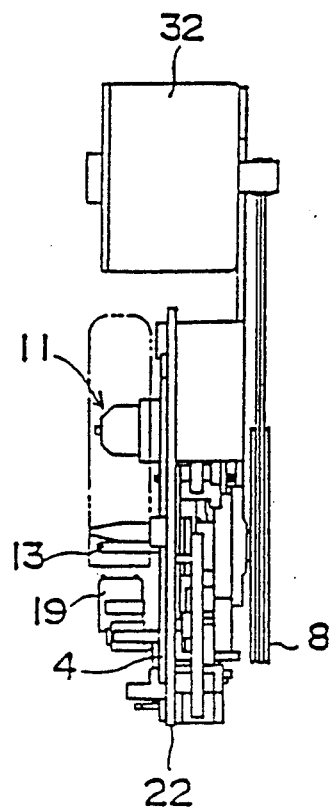
FIG. 8 is a side view thereof.
Figure 9A:
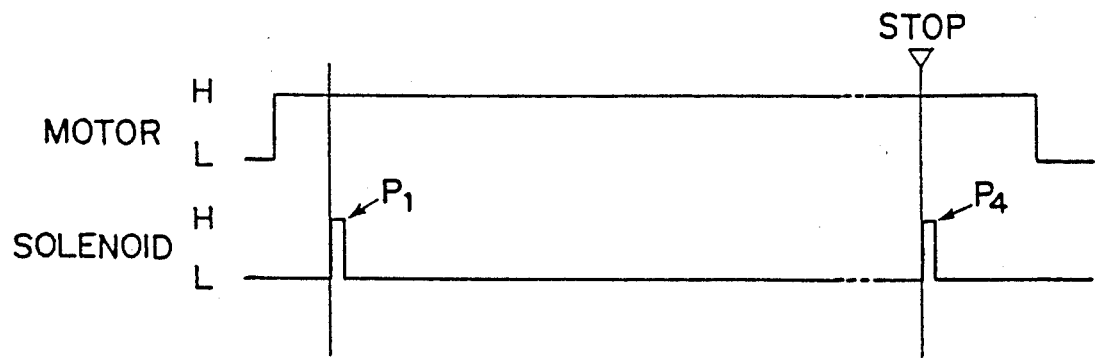
FIGS. 9A to 9C are time charts for a latch solenoid, FIG. 9A indicating the stop arrow playback/record state, FIG. 9B the stop arrow fast forward state, and FIG. 9C the stop arrow re-wind state.
Figure 9B:
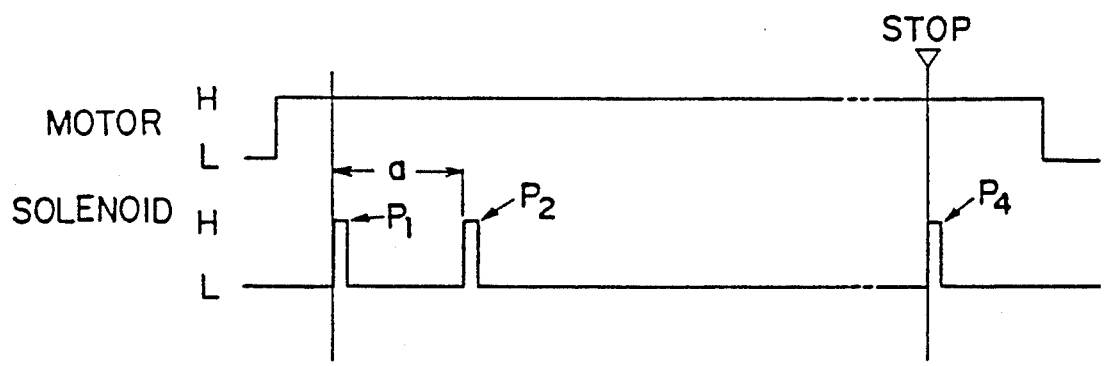
Figure 9C:
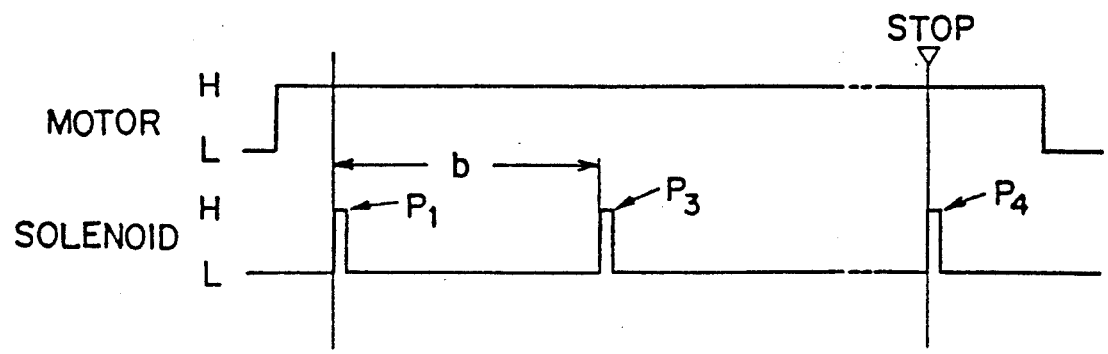

Rewind (FIG. 1 to FIG. 3: refer to FIG. 9c)

Accompanied by the selection of the rewind mode, when a predetermined period of time b has lapsed after the pulse $P_1$ was made to flow through the latch solenoid 28, a pulse $P_3$ is caused to flow therethrough. At first, the flow of the pulse $P_1$ causes the trigger arm 3 to be thrust away from the latch solenoid 2 and rotated clockwise around the shaft 27 by the force of the spring 18 to engage the assist gear 2 with the flywheel gear 8a, as described above. Immediately thereafter, the pin 3c of the trigger arm is energized clockwise by the succeeding cam face 35b of the assist cam 35 so that the trigger arm is returned to its initial position. As the rotation of the assist gear 2 advances further, the pin 6a of the tension FR arm is regulated by the cam faces 34a and 34b of the assist cam 34 for the mode selection.

After the FR gear 37 supported by the FR arm 5 has been brought close to the T reel 10, it is displaced so as to be brought close to the S reel 11. At this time, the pulse $P_3$ is made to flow through again through solenoid 28, and the trigger arm 3 is driven so that the pin 5a of the FR arm 5 is brought into contact with the FR arm regulating portion 3d. Then, the counterclockwise movement of the FR arm 5 is prevented by the selecting portion 3d of the trigger arm 3. This state is kept, regardless of the advance of the rotation of the assist gear 2. As the assist gear rotates further, the head base plate 4 is displaced in the direction along which it is thrust on the capstan shaft 13, by moving the pin 1a of the assist arm counterclockwise, relatively, following the counter of the head base plate sliding assist cam 33. At this time, the pin 21 is brought into contact with the inclined face 26b of the regulating portion 26 on the FR arm 5 to engage the FR gear 37 with the REW gear 12. Further, since the pin 21 is regulated in position by the inclined face 26b, the coaxial pinch roller 20 can be displaced no further. Therefore, it is not brought into contact with the capstan shaft 13, but is stopped at the REW position. Furthermore, the shaft 37a of the FR gear 37 is inserted in the groove close to the S reel 11 of the cut-off groove 47 and supported there. On the other hand, the trigger arm 3 is returned to the initial position thereof by the cam face 35c of the assist cam 35 for the trigger arm.

PLAY (FIG. 1 to FIG. 4: refer to FIG. 9A)

When the pulse $P_1$ is made to flow through the solenoid 28, accompanied by the selection of the playback-/record mode, the trigger arm 3 is thrust away from the latch solenoid 28 and is operated by the force of the spring 18 to engage the assist gear 2 with the flywheel gear a. This trigger arm 3 is then energized by the cam face 35b and returned to the initial position thereof, as discussed above.

As the rotation of the assist gear 2 advances, the movement of the tension FR arm 6 is regulated by the assist ca 34 for the mode selection and the FR gear 37 supported by the FR arm 5 is once again brought close to the T reel. When the rotation of the assist gear 2 advances further, gear 37 is brought close to the S reel 11 and when the rotation advances further, gear 37 returns again to the center. Then it enters the central groove of the cut-off groove 47 and is supported there. At this time, since a displacement is given to the pin 1a of the assist arm 1 by the head base plate sliding assist cam 33, the assist arm 1 is rotated clockwise around the pin 1a at the same time as the movement of the pin 1a occurs, to thereby slide the head base plate 4 towards the capstan shaft 13. At the same time the play arm 7 is energized by the engaging piece 4a on one end of the head base plate 4, and is rotated counterclockwise around the shaft 45 to engage the idler gear 9 on the extremity thereof with the flywheel gear 8a and the play gear 41 simultaneously. At this time, in the state where the pin 21 enters the groove 26c of the regulating groove 26 on the FR arm 5 (FIG. 4) and the FR arm 5 is fixed at the neutral position, the capstan shaft 13 and the pinch roller 20 are brought also into contact almost at the same time and are stopped at the play position. In this state, the first cut-off toothed portion 24 of the assist gear 2 is positioned so as to be opposite to the flywheel gear 8a and the engagement with the flywheel gear 8a is removed. This stops the rotation of gear 2, with the result that the head base plate sliding assist cam 33 also stops rotating. In this state, the engaging piece 4a of the head base plate 4 is engaged with the engaging piece 7a of the play arm 7 and the mechanism is locked so that the engagement of the idler gear 9 with the flywheel gear 8a is not removed. At the same time, the regulating portion 3a of the trigger arm, which is in the reset state, and one of the protrusions 36b of the assist gear 2 are engaged with each other. In this way the counterclockwise movement of the assist gear is locked, and the mechanism remains in the PLAY mode.

From each of the modes to STOP (FIG. 1)

When the operation in either one of the modes is changed into the stop mode by the selection of the stop mode or automatically by the detection of the tape end, etc., a pulse $P_4$ is made to flow through the solenoid and the trigger arm 3 is driven so as to thrust the cam face 35d of the assist cam 35. This engages the assist gear 2, whose cut-off toothed portion 24 has been positioned so as to be opposite to the flywheel gear 8a, with the flywheel gear 8a. Almost at the same time as the start of the rotation of the assist gear 2, the pin 1a of the assist arm 1 is returned to the STOP position (FIG. 1) by cam surface 33b of the head base plate sliding assist cam 33. As the rotation of the head base plate sliding assist cam 33 advances, the engagement with pin 1a is removed at the position where the cut-off toothed portion 25 of the assist gear 2 is opposite to the flywheel gear 8a and the rotation is stopped. That is, the STOP state is realized. At the same time trigger arm 3 is returned to the initial position thereof by the cam face 35e so that the protrusion 36a and the regulating portion 3a of the trigger arm 3 are engaged with each other to lock the rotation of the assist gear 2. Further, in either one of the modes, the motor 32 is turned on before the operation of the latch solenoid 28 and stopped after having switched-over to the stop mode.

The embodiment described above is an example of the suitable realization of the present invention, and the present invention is not restricted thereto, but various modifications can be made within the scope of the spirit of the present invention. For example, an attractive solenoid may be adopted for the solenoid 28 so that the movement of the trigger arm 3 is effected by the attractive operation of the attractive solenoid 28. In this case, the assist cam 35 for the trigger arm is unnecessary. Further, the operation of the solenoid 28 can be sufficiently effected only by making flow constant pulses with a timing, where the movement of the trigger arm 3 is required.

FIGS. 10 to 13 illustrate another embodiment of the present invention. In this embodiment, the tension FR arm 6 and the trigger arm 3 of the preceding embodiment are integrated into one body. Furthermore, the control to move the fast forward and rewinding switching member is effected by direct driving by the latching solenoid 28, thereby omitting the mode selecting assist cam 34. The pivoting of the FR arm 6 is effected by a slide plate, and this slide plate is moved by a pin disposed at the base end. This embodiment is explained in detail as follows:

The tape recorder of the embodiment of FIGS. 10 to 13 comprises at least a latching solenoid 128 (FIG. 11) with a trigger arm 103 transmitting the movement of this latching solenoid 128 to an assist gear 102. A head base plate sliding assist cam 133, whose rotation is controlled by the trigger arm 103 moves the head base plate 104 by way of an assist arm 101. As before, a magnetic head 119, etc., are mounted on the head base plate 104. The assist arm 101 follows the cam 133. A mode selecting slide plate 134 (FIG. 10) shifts an FR gear 137 (FIG. 11) to a position corresponding to each mode by way of a mode selecting FR arm pin 106 on the trigger arm 103. The assist gear 102 is engages selectively with a driving gear such as a flywheel gear 108a, which is rotated by a motor 132. This selective engagement is carried out by the drive of a latching solenoid 128 used as a trigger. An FR arm 105 rotatably supports the mode switching FR gear 137 at a position corresponding to each set mode. A cut-off groove 147 is formed in the head base plate 104 (FIG. 10) to indicate corresponding positions of the FR gear 137 for the different set modes. This tape recorder is so constructed that the assist gear 102 is engaged with the flywheel gear 108a which is connected to the motor for rotation. The slide plate 134 is moved by the trigger arm 103 is a direction perpendicular to the direction of motion of the head base plate 104. By moving the head base plate 104 in this way and at the same time by driving again the latching solenoid 128 when the head base plate 104 reaches a position where the mode selection is possible, the FR arm 105 is rotated to a corresponding mode position and fixed there to switch-over the set mode. Mode selection is possible when the mode selecting plate 134 is moved to a predetermined mode selecting position.

Figure 10:
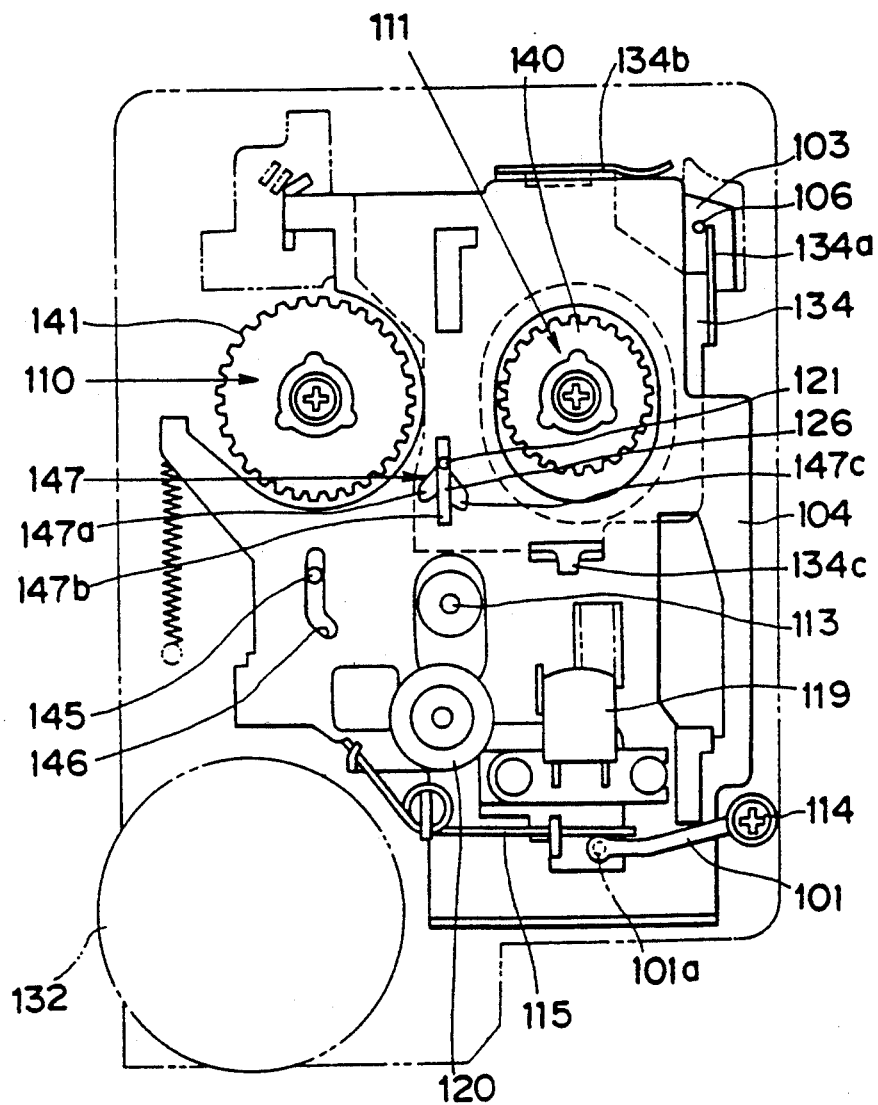
FIGS. 10 to 12 illustrate another embodiment of the tape recorder according to the present invention, the mechanism omitting the chassis, FIG. 10 being a plan view thereof, FIG. 11 being a bottom view, and FIG. 12 being a plan view indicating the head base plate sliding assist cam side of the assist gear.

The assist arm 101 described above is disposed for the purpose of moving the head base plate 104 towards a capstan shaft 113 formed in one body with the flywheel 108. By rotating the head base plate sliding assist cam 133 (FIG. 12), the assist arm 101 is moved rotatably around its shaft 114 which is mounted on a chassis 122. The assist arm 101 is brought into contact with the head base plate 104 through the return torsion coil spring 115 (FIG. 10). The return torsion coil spring 115 energizes the head base plate 104 so that it is always biased towards the stop position. An assist pin 101a is formed unitarily on the extreme end of the assist arm 101 so as to engage the head base plate sliding assist cam 133 of the assist gear 102, following the contour thereof.

Figure 12:
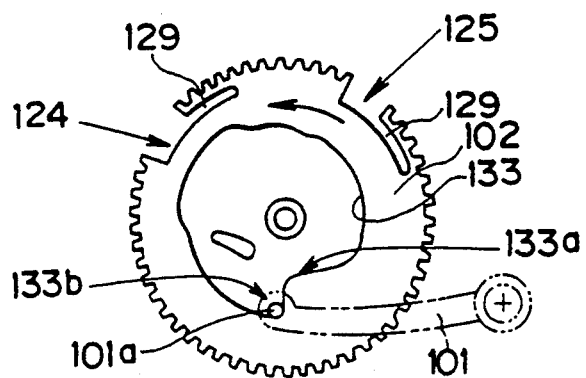

The assist gear 102 is used as a driving source which effects the switching-over of the slide gear (mode switching) of the head base plate 104, using the rotating force of the motor 132. As illustrated in FIG. 12, gear 102 has a portion 124 which lacks teeth, which portion is opposite to the flywheel gear 108a when one of the modes of playback/record, fast forward and rewinding is selected. Gear 102 has another portion 125 which also lacks teeth and which is opposite to the flywheel gear 108a when the stop mode is selected. Gear 102 can be rotated only when it is engaged with the flywheel gear 108a around the shaft 123 mounted on the chassis 122. Further, following each of the tooth-lacking parts 124 and 125, there is formed a cut-off portion 129 (FIG. 12) so as to give the gear elasticity in the radial direction to thereby facilitate the engagement with the flywheel gear 108a. A head base plate sliding assist cam 133 driving the assist arm 101 is formed on one web face of this assist gear 102. An assist cam 135 for the trigger arm driving the trigger arm 103 and protrusions 136a and 136b for fixing the assist gear 102 by the trigger arm 103 therebetween are formed on the other Web face in one body.

The mode selecting slide plate 134 is mounted by means of a spring portion 34b (FIG. 10) and an engaging piece 134c so that it is movable along the head base plate 104 in a direction perpendicular to the direction of motion of the head base plate 104. This mode selecting slide plate 134 has an elongated groove 126 extending in the direction of motion of the head base plate 104. A pin 121, which is coaxial to the FR gear 137 of the FR arm 105, is inserted in this elongated groove 126 and is disposed so as to be able to adjust the position of the FR gear 137 in the direction perpendicular to the movement direction of the head base plate 104. This mode selecting slide plate 134 slides in the direction perpendicular to the head base plate by reason of the fact that the engaging piece member 134a is engaged with the FR arm pin 106 formed on the base end of the trigger arm 103. In this way, the FR gear 37 supported by the FR arm 105 will engage either one of the grooves 147a, 147b and 147c of the cut-off groove 147 formed in the head base plate 104.

The head base plate sliding assist cam 133 is disposed for the purpose of displacing the assist arm 101 and for pushing in a magnetic head 119 on the head base plate 104 and a pinch roller 120 towards a predetermined position. Cam 133 has a portion 133a which gives the greatest displacement when the tooth-lacking portion 124 of the assist gear 102 is opposite to the flywheel gear 108a; that is, at the mode setting. Cam 133 also has a Stop portion 133b, which returns the head base plate to its original Stop portion immediately thereafter and holds it there in a stable portion.

The assist cam 135 for the trigger arm consists of three protrusions, one of which includes a cam face 135a which gives a slight forward positive rotation to engage assist gear 102 with flywheel gear 108a when the trigger arm 103 is thrust away from the latching solenoid 128. This occurs when the flywheel gear 108a is opposite to the tooth-lacking portion 125 of the assist gear 102, at which time the flywheel gear 108a is disengaged from the assist gear 102. The protrusions also include a cam face 135b for resetting, a cam face 135c for resetting, and a cam face 135d which also gives a slight forward positive rotation to the assist gear 102 to cause it to engage with the flywheel gear 108a. Cam face 135d causes such engagement when the flywheel gear 108a is opposite to the tooth-lacking portion 124 of gear 102, when the flywheel gear 108a is disengaged from the assist gear 102. Cam 135 also includes a cam face 135e for resetting and a cam face 135f for resetting.

Figure 11:
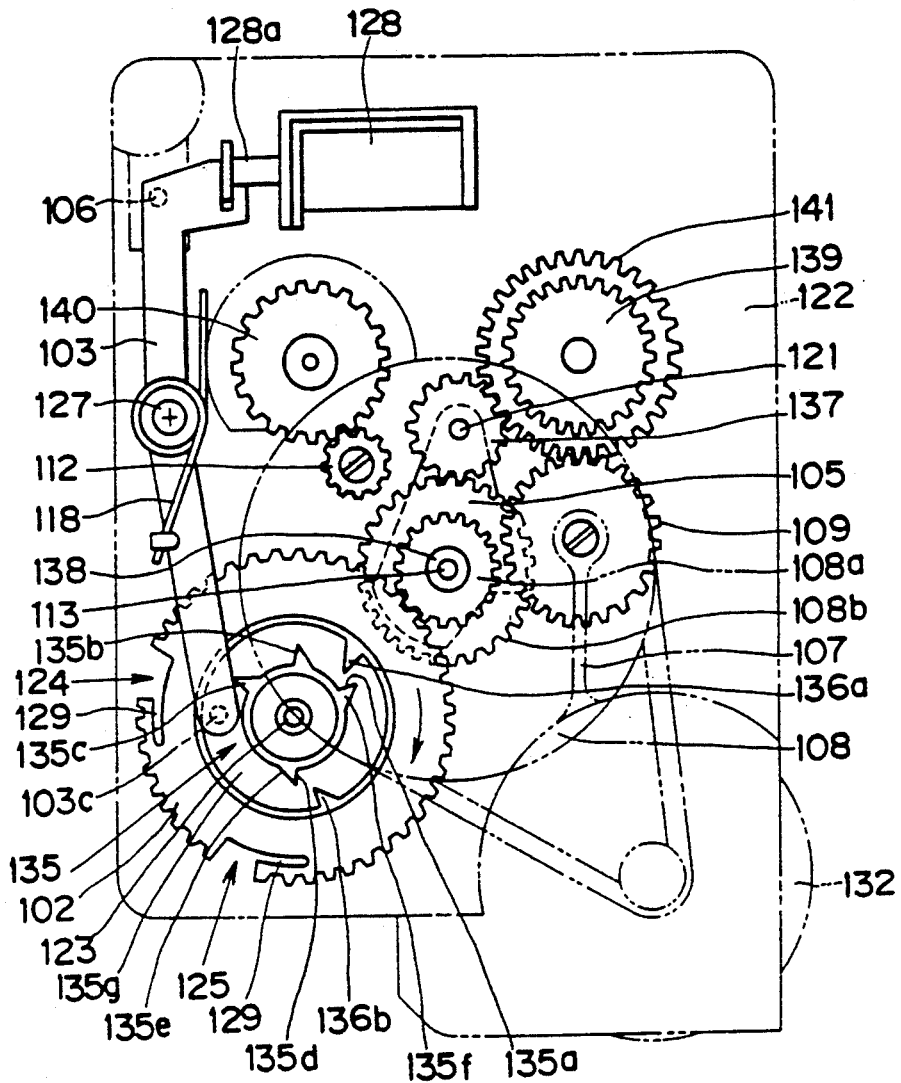

The head base plate 104, on which the magnetic head 119 and the pinch roller 120 are mounted, makes these elements slidable on the chassis 122 towards the capstan shaft 113 and the tape (not shown in FIGS. 10 to 12). This head base plate 104 is supported slidably in one direction; that is, in the direction where the pinch roller 120 comes close to the capstan shaft 113 or moves away therefrom, by guiding protrusions (not shown) or grooves (not shown). Further, a displacement stroke end of this head base plate 104 is set by a positioning member disposed between the chassis 122 and the head base plate 104. In addition, the cut-off groove 147, consisting of three grooves 147a, and 147b and 147c is formed in this head base plate 104 for guiding the FR gear 136 around the flywheel gear 108a to a Rewinding position (right upper side in FIG. 10), a Fast Forward position (left upper side in FIG. 10) and a Playback-/Record position (middle upper side in FIG. 10) and stabilizing the gear 137 in those positions. The flywheel gear 108a is coaxial to the capstan shaft 113.

For the solenoid 128, a latching solenoid is adopted which causes its plunger to protrude only when it is fed with current. This latching solenoid 128 is attracted by an iron core by the attractive force of a magnet integrated therein, when it is not supplied with current. Therefore, when the trigger arm 103 is driven by the reset cams 135b, 135c, 135e or 135f so that the plunger 128a of the latching solenoid 128 is pushed to be returned, the solenoid is latched and is held in that state until a succeeding current feed.

The FR arm 105 is freely rotatably mounted on a sleeve-shaped bearing 138 supporting the capstan shaft 113 on chassis 122 and is inserted in the elongated groove 126 formed in the slide plate 134, to be held there.

The trigger arm 103 is disposed rotatably around a shaft 127 on the chassis 122. One end thereof is engaged with the plunger 128a of the latching solenoid 128 and the other end is engaged with the assist gear 102 so as to be able to move in a groove 135g between the assist cam 135 for the trigger arm of the assist gear 102 and the protrusions 136a, 136b. The extremity of the trigger arm 103 on the assist gear 102 side has a pin 103c following the cam faces 135a, 135b, . . . , 135f and the protrusions 136a, 136b, and the latching solenoid 128 is always energized by a torsion coil spring 118. In the mechanism of this embodiment the mode selection is effected by cooperation of the reset cams 135b, 135c and the drive timing of the latching solenoid 128.

The FR arm 105 is rotated around a sleeve 138, which is coaxial to the flywheel 108, and supported so that it can rotate the FR gear 137 while it remains engaged with flywheel gear 108b. Sleeve 138 has a large diameter for increasing the speed on its own axis while moving gear 137 around the flywheel gear 108b. Pin 121, which passes through the elongated groove 126 in the slide plate 134, moves along the head base plate 104, and engages the slide plate 134, is disposed at the center of the FR gear 137 on the FR arm 105. The arm 105 regulates the movement of the pin 121 by the slide plate 134 and the head base plate 104, and fixes the pin temporarily at an arbitrary position corresponding to one of the modes PLAYBACK/RECORD, FAST FORWARD and REWINDING. The engaging piece member 134a, which is engaged with the FR arm pin 106 formed at the base end of the trigger arm 103, is disposed on the slide plate so that the slide plate 134 is moved by movement of the trigger arm 103. The engaging piece portion 134a is disposed in such a positional relation that it is engaged with the FR arm pin 106 of the trigger arm 103 when the pin 121, in the elongated groove 126 formed in the slide plate 134, reaches the branch point of the fork-shaped cut-off groove 147 in the head base plate 104.

A play arm 107 (FIG. 11) is a plate spring formed in one body together with e.g. a plastic body forming the chassis 122 and having a flexibility. It is disposed so as to be able to move an idler gear 109, mounted on the extremity thereof, in the direction where it is separated from the flywheel gear 108a or engaged therewith by the cam groove 146 formed in the head base plate 104. The center shaft 145 of the idler gear 109 passes through the cam groove 146 so that the movement direction thereof is restricted by the cam groove 146. The idler gear 109 is engaged with the flywheel gear 108a only at the PLAYBACK/RECORD by bending the play arm 107 by the action of the cam groove 146. The flywheel gear 108a is engaged with a PLAY gear 141 on the T reel 110 side through the idler gear 109. The T reel 110, the S reel 111 and the REW gear 112 are disposed on the chassis 122 rotatably. The REW gear 112 and the S reel 111 side gear 140 are always engaged with each other. Further, the gear for the T reel 110 has a two-step structure, i.e. a gear 141 for PLAY and a gear 139 for FF, which require separate torque mechanisms.

Figure 13A:
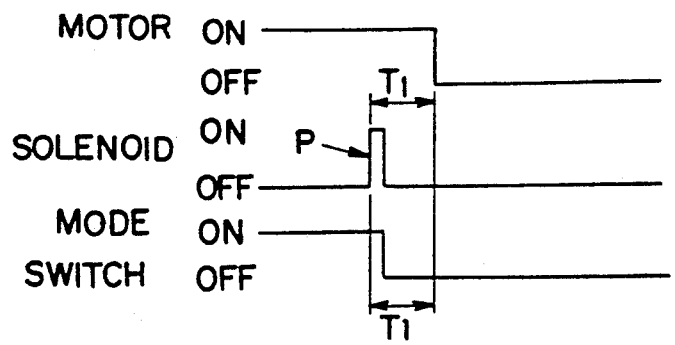
FIGS. 13(A) to (G) are timing charts indicating the driving timing of the latching solenoids in the embodiment of FIGS. 10 to 12, chart (A) indicating the case of switching-over from each of the fast forward (FF), play, and re-wind (REW) modes, to the STOP mode, chart (B) indicating the switching over from the STOP mode to the PLAY mode, chart (C) indicating the switching over from the FF, REW mode to the PLAY mode, chart (D) indicating the driving timing for switching over from the STOP mode to the FF mode, chart (E) indicating the driving timing for switching over from the PLAY, REW mode to the FF mode, chart (F) indicating the driving timing for switching over from the STOP mode to the REW mode, and chart (G) indicating the driving timing for switching over from the PLAY, FF mode to the REW mode.
Figure 13B:
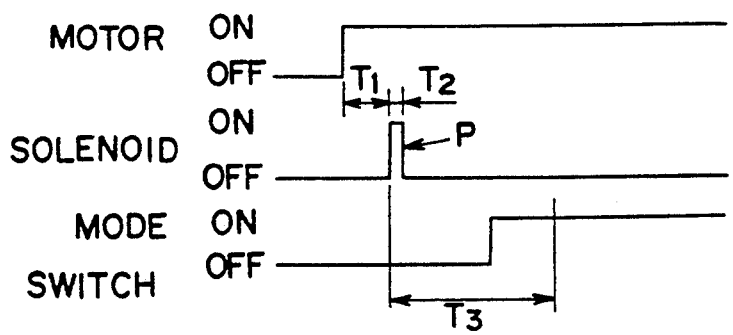
Figure 13C:
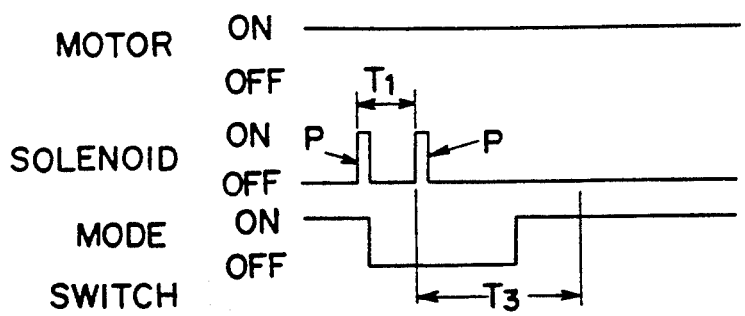
Figure 13D:
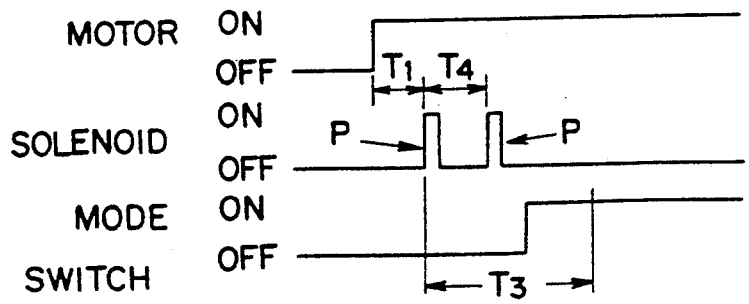

Since the tape recorder is so constructed as described above, the mode switching is effected as follows:

From STOP mode to FF mode (Refer to FIG. 13D)

When the fast forward (FF) mode is selected at the stop mode, after some time $T_1$ from the start of the motor 132, the latching solenoid 128 is fed with a pulse P. In this way, the trigger arm 103 is pushed away from the latching solenoid 128 and rotated in the counterclockwise direction (in FIG. 11) around the shaft 127 by the force of the torsion coil spring 118. Pin 103c at the end of arm 103 thrusts the cam face 135a of the assist cam 135. In this way, the assist gear 102 is rotated slightly in the counterclockwise direction (in FIG. 11), in the state where the flywheel gear 108a is opposite to the teeth lacking portion 125 and they are not engaged with each other, so that gear 102 becomes engaged with the flywheel gear 108a. Then, the pin 101a of the assist arm 101 is rotated in the clockwise direction (in FIG. 10), following the head base plate sliding assist cam 133 by the fact that the assist gear 102 is rotated by the force of the motor 132, so that the head base plate 104 is moved towards the capstan shaft 113. At the same time, the trigger arm 103 is rotated in clockwise direction around the shaft 127 by the reset cam face 135b of the assist cam 135 so as to return the latching solenoid 128 to its original position.

After time $T_4$ from the operation of the latching solenoid 128 described above, the latching solenoid 128 is fed again with current so that the trigger arm is rotated counterclockwise. At this time, the head base plate 104 is in the course of moving the pinch roller 120 towards the capstan shaft 113 by the rotation of the assist gear 102. The FR arm pin 106 at the base end of the trigger arm 103 is brought into contact with the engaging piece member 134a of the slide plate 134 by the movement of the trigger arm so that the slide plate 134 is slid in a transverse direction (upward to the left in FIG. 10), and the pin 121 of the FR arm 105 is engaged with the groove 147a at the FF position.

Since further movement of the head base plate 104 is restricted in this way, the pinch roller 120 and the capstan shaft 113 are not brought into contact with each other, but they remain at the FF position. After the trigger arm 103 has been returned to the original position by the reset cam face 135e of the assist cam 135, it gets over the reset cam face 135e and engages one of the protrusions 136b of the assist gear 102 so as to lock the counterclockwise movement of the assist gear. In this state, the first teeth lacking portion 124 of the assist gear 102 is located so as to be opposite to the flywheel gear 108a and the engagement thereof with the flywheel gear 108a is removed. Thus the head base plate sliding assist cam 135 is not rotated further.

Figure 13E:
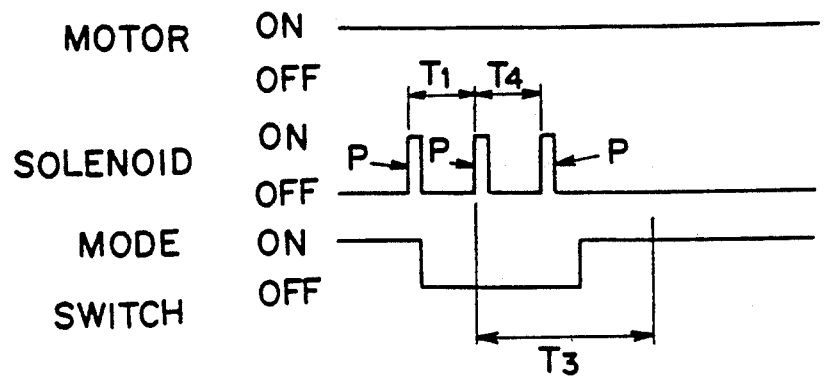
Figure 13F:
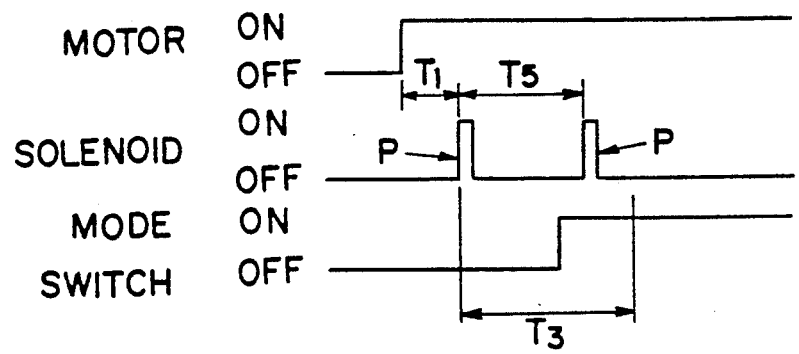

From STOP mode to REW mode (Refer to FIG. 13F)

In the case where the REW mode is selected in the STOP mode, after $T_1$ from the start of the motor the latching solenoid 128 is fed with a pulse P and further after a lapse of time $T_5$ it is fed with another pulse P. At first, by the feed with the first pulse P, similarly to the case of the FF mode described previously, the trigger arm 103 is thrust away from the latching solenoid 128 and rotated counterclockwise around the shaft 127 by the force of the torsion coil spring 118 so as to engage the assist gear 102 with the flywheel gear 108a. In this way the head base plate 104 is pushed out towards the capstan shaft 113 by the fact that the pin 101a of the assist arm 101 is moved, accompanied by the rotation of the assist gear 102, following the contour of the head base plate sliding assist cam 113. On (he other hand, the pin 103c of the trigger arm 103 is returned to its original position by the reset cam face 135b of the assist cam 135 for the trigger arm. Further, as the rotation of the assist gear 102 advances, the head base plate 104 is pushed out to the capstan shaft 113 side by the assist arm 101. At the pint of time where the engaging piece member 134a of the slide plate 134 is engaged with the FR arm pin 106, i.e. after $T_4$ from the first pulse, the latching solenoid 128 is fed again with a pulse P and the trigger is driven so as to move the slide plate 134 upward to the right in FIG. 10 by the FR arm pin 106. In this way, the pin 121 of the FR arm 105 in the elongated groove 126 is introduced into the cut-off groove 147C of the REW position in the head base plate 104. Further, the trigger arm 103 is reset on the reset cam 135e by the rotation of the assist gear 102. Then it is engaged with the protrusion 136b after having got over the reset cam 135e and held there in this state.

From STOP mode to PLAY mode (Refer to FIG. 13B)

In the case where the PLAYBACK/RECORD mode is selected while in the STOP mode, when the latching solenoid 128 is fed with a pulse P, the trigger arm 103 is thrust away from the latching solenoid 128 and operated by the force of the torsion coil spring 118 so as to engage the assist gear 102 with the flywheel gear 108a. This trigger arm 103 is energized by the reset cam face 135b to be returned to its original position.

As the rotation of the assist gear 102 advances, since displacement is given to the assist pin 101a of the assist arm 101 by the mode selecting assist cam 134, the pin 101a causes the assist arm 101 to rotate clockwise around the shaft 114 and slides the head base plate 104 to the capstan shaft 113 side through the torsion coil spring 115. At the same time, the play arm 107 is energized by the cam groove 146 of the head base plate 104 so as to engage the idler gear 109 disposed at the extremity thereof simultaneously with the flywheel gear 108a and with the play gear 141. At this time, the location pin 121 of the FR arm 105 is restricted by the elongated groove 126 formed in the slide plate 134 and causes the FR arm 105 to be fixed at its neutral position 147b. In this way, the pinch roller 120 is brought into contact with the capstan shaft 113 with an appropriate pressure to be stopped at the PLAY position. Then, in this state, the first teeth locking portion 124 of the assist gear 102 is located so as to be opposite to the flywheel gear 108a and the engagement with the flywheel gear 108a is removed. Thus they are so disposed that the head base plate sliding assist cam 135 is not rotated further. In this state, the cam groove 146 of the head base plate 104 locks the play arm 109 so that the engagement of the idler gear 109 with the flywheel gear 108a is not removed. At the same time, the pin 103c disposed at the extremity of the trigger arm 103, which is the reset state, is engaged with one of the protrusions 136b of the assist gear 102 so as to lock the movement of the assist gear 102.

From the different modes to STOP mode (Refer to FIG. 13A)

When the stop mode is selected in the course of the operation of the different modes or when they are switched-over automatically to the STOP mode by a detection of the tape end, etc., the solenoid is fed with a pulse P so as to drive the trigger arm 103, which thrusts the cam face 135d of the assist cam 135 for the trigger arm. In this way, the assist gear 102 located so as to be opposite to the flywheel gear 108a is somewhat rotated to be engaged with the flywheel gear 108a. Then, almost at the same time as the start of the rotation of the assist gear 102, the pin 101a of the assist arm 101 is returned to the STOP position 133b of the head base plate sliding assist cam 133. As the rotation of the head base plate sliding assist cam 133 continues further, the engagement is removed at a position where the teeth lacking portion 125 of the assist gear 102 is opposite to the flywheel gear 108a, i.e. the STOP position, and the rotation is stopped. That is, the STOP state is realized. The trigger arm 103 is returned to its original position by the first reset cam face 135f after the state of the rotation of the assist gear 102. Further, at the STOP position, the protrusion 136a is engaged with the pin 103c of the trigger ar 103 so that the rotation of the assist gear 102 is locked For any mode, the motor 132 is switched-on before the operation of the latching solenoid 128 and stopped after a predetermined period of time has lapsed from the switching-over to the STOP mode.

From FF, REW modes to PLAY mode (Refer to FIG. 13C)

In the case where the PLAYBACK/RECORD mode is selected in the FF mode or the REW mode, the latching solenoid 128 is fed with a pulse P, while the motor 132 remains in the ON state. After $T_1$ therefrom it is fed again with a pulse P to drive the trigger arm. The trigger arm 103 is thrust away from the latching solenoid 128 by the feed of the latching solenoid 128 with the pulse P to rotate somewhat the assist gear 102 in order to engage it with the flywheel gear 108a. In this way, the motor 132 starts the rotation of gear 102 in a predetermined direction. The pin 101a of the assist arm 101 is shifted to the STOP position 133b of the head base plate sliding assist cam 133 to return the head base plate 104 to its STOP position. Then the trigger arm 103 is energized by the reset cam face 135f to be returned to its original position. At the same time, the pin 103c of the trigger arm 103 gets over the reset cam face 135f to be brought into contact with the protrusion 136a so that the rotation of the assist gear 102 is locked. Therefore, after a lapse of time $T_4$ the latching solenoid 128 is fed again with current to drive the trigger arm 103. In this way, the assist gear 102 is somewhat rotated to be engaged with the flywheel gear 108a. By this engagement, receiving the rotation of the motor 132, the assist gear 102 is rotated in a predetermined direction. In this way, the trigger arm 103 is energized by the reset cam face 135b to be returned to its original position. The pin 103c is brought into contact with the protrusion 136b and fixed between the protrusion 136b and the cam face 135d. In this way the teeth lacking portion 124 of the assist gear 102 is opposite to the flywheel gear 108a and the rotation of the motor 132 is stopped.

From PLAY, REW mode to FF mode (Refer to FIG. 13E)

In the case where the FF mode is selected in the PLAY mode or the REW mode, the latching solenoid 128 is fed with the first pulse P, while the motor remains in the ON state. After $T_1$ therefrom and further after $T_4$ the solenoid is fed again with the pulses P. When it is fed with the first pulse P, the trigger arm 103 is driven to push the cam face 135d of the assist cam 135 for the trigger arm. The teeth lacking portion 124 rotates somewhat the assist gear 102 located so as to be opposite to the flywheel gear 108a to engage it with the flywheel gear 108a. Then, almost at the same time as the start of the rotation of the assist gear 102, the pin 101a of the assist arm is returned to the STOP position 133b of the head base plate sliding assist cam 133. As the rotation of the assist gear 102 continues as it is, at the position where the teeth lacking portion 125 is opposite to the flywheel gear 108a, i.e. at the STOP position, the pin 103c of the trigger arm 103 is brought into contact with the protrusion 136a and at the same time it removes the engagement of the assist gear 102 with the flywheel gear 108a to stop the rotation of the assist gear 102. That is, the STOP state is realized. After the start of the rotation of the assist gear 102, the trigger arm 103 is returned to its original position by the first reset cam face 135f. Further, at the STOP position, the protrusion 136a and the pin 103c of the trigger arm 103 are engaged with each other and the rotation of the assist gear 102 is locked.

Then, by the fact that the solenoid is fed again after $T_1$ with the pulse P, the trigger arm 103 is thrust away from the latching solenoid 128 and rotated counterclockwise (in FIG. 11) around the shaft 127 by the force of the torsion coil spring 118 to thrust the cam face 135a of the assist cam 135 for the trigger arm by the pin 103c disposed at the extremity thereof. In this way, the assist gear 102, on which the teeth lacking portion 125 is opposite to the flywheel gear 108a is slightly rotated clockwise (in FIG. 11) so that the teeth lacking portion is engaged with the flywheel gear 108a.

Next, the trigger arm 103 is rotated clockwise around the shaft 127 by the reset cam face 135b by rotating the assist gear 102 by the force of the motor 132 to return the latching solenoid 128 to its original position. Furthermore, after $T_4$ from the operation of the latching solenoid 128 described above, the latching solenoid 128 is fed again with current and thrusts away the trigger arm 103 to rotate it counterclockwise (in FIG. 11). At this time, the head base plate 104 is in the course of moving the pinch roller 120 towards the capstan shaft 113 by the rotation of the assist gear 102 and the FR arm pin 106 on the base end of the trigger arm 103 is brought into contact with the engaging piece 134a of the slide plate 134 by the movement of the trigger arm 103. In this way it slides the slide plate 134 in a transverse direction (upward to the left in FIG. 10) to insert the pin 121 of the FR arm 105 in the groove 147a at the FF position.

Since the movement of the head base plate 104 is restricted in this way, the pinch roller 120 is not brought into contact with the capstan shaft 113, but stopped at its FF position. Then, the trigger arm 103 gets over the reset Cam face 135e and is engaged with one of the protrusions 136b of the assist gear 102 to lock the movement of the assist gear 102, after having been returned to its original position by the reset cam 135e of the assist cam for the trigger arm. In this state, the first teeth lacking portion 124 of the assist gear 102 is located so as to be opposite to the flywheel gear 108a and the engagement thereof with the flywheel gear 108a is removed. They are so disposed that the head base plate sliding assist cam 136 is not rotated further.

Figure 13G:
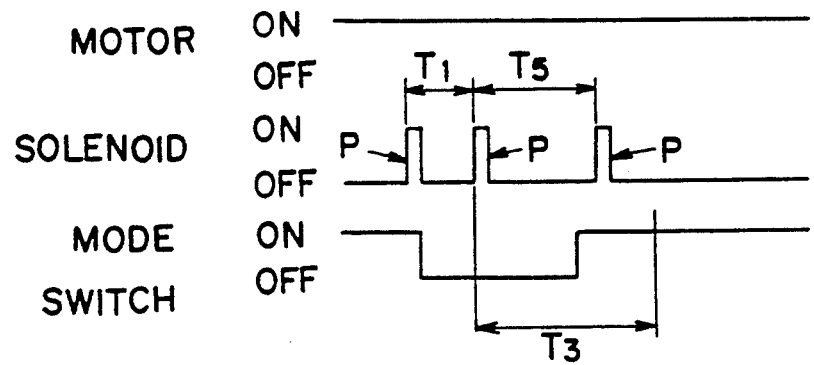

From PLAY, FF mode to REW mode (Refer to FIG. 13G)

In the case where the REW mode is selected in the PLAY mode or FF mode, the latching solenoid 128 is fed with a first pulse P, while the motor remains in the ON state. After $T_1$ therefrom and further after $T_5$ therefrom, it is fed again with pulses P. When it is fed with the first pulse P, the trigger arm 103 is driven so as to thrust the cam face 135d of the assist cam 135 for the trigger arm and to rotate somewhat the assist gear 102, which has been located so that the teeth lacking portion 124 is opposite to the flywheel gear 108a, to engage it with the flywheel gear 108a. Then the pin 101a of the assist arm 101 is returned to the STOP position 133b of the head base plate sliding assist cam 133 almost at the same time as the start of the rotation of the assist gear 102. As the assist gear 102 rotates further as it is, the pin 103c of the trigger arm 103 is brought into contact with the protrusion 136a at the position where the teeth lacking portion 125 is opposite to the flywheel gear 108a, i.e. at the STOP position. The engagement of the assist gear 102 with the flywheel gear 108a is removed and the rotation of the assist gear 102 is stopped. That is, the STOP state is realized.

After the start of the rotation of the assist gear 102, the trigger arm 103 is returned to its original position by the first reset cam face 135f. Further, at the STOP position, the protrusion 136a is engaged with the pin 103c of the trigger arm 103 to lock the rotation of the assist gear 102. By the fact that the solenoid is fed again with the pulse P after $T_1$ from the first pulse P, the trigger arm 103 is thrust away from the latching solenoid 128 and rotated counterclockwise (in FIG. 11) around the shaft 127 by the force of the torsion coil spring 128 to cause pin 103c to push the cam face 135a of the assist cam 135. In this way, the assist gear 102, on which the teeth lacking portion 125 is opposite to the flywheel gear 108a, is rotated slightly (in FIG. 11) to be engaged with the flywheel gear 108a. Next, by the fact that the assist gear 102 is rotated clockwise around the shaft 127 by the reset cam face 135b of the assist cam 135 for the trigger arm to return the latching solenoid 128 to its original position. Further, after $T_5$ from the point of time where the latching solenoid 128 is driven, as described above, the trigger arm 103 is thrust away counterclockwise. At this time, the head base plate 104 is in the course of moving the pinch roller 128 towards the capstan shaft 113 by the rotation of the assist gear 102 and the FR arm pin 106 at the base end of the trigger arm 103 is brought into contact with the engaging piece member 134a of the slide plate 134 by the movement of the trigger arm 103. In this way, it slides the slide plate 134 in the transversal direction (upward to the right) so as to insert the pin 121 of the FR arm 105 in the groove 147c at the REW position.

Since the movement of the head base plate 104 is restricted in this way, the pinch roller 120 is not brought into contact with the capstan shaft 113, but it is stopped at the REW position. Then the trigger arm 103 gets over the reset cam face 135e and it is engaged with one of the protrusions 136b of the assist gear 102 to lock the counterclockwise movement of the assist gear after having been returned to its original position by the reset cam face 135e of the assist cam 135 for the trigger arm. In this state, the first teeth lacking portion 124 of the assist gear 102 is located so as to be opposite to the flywheel gear 108a and the engagement thereof with the flywheel gear 108a is removed. They are disposed so that the head base plate sliding assist cam 135 is not rotated further. Concerning the time $T_3$ on the timing chart, since the mechanism is switched-over to the setting mode by using the force of the motor up to that time and it is not assured that the tape is advanced with a constant speed, it means the time where the playback/record of the tape is not effected.

The embodiments described above represent examples of preferred embodiments of the present invention. However it is not restricted thereto, but various modifications may be made without departing from the spirit of the present invention. For example, an attracting solenoid may he adopted for the latching solenoid 28, 128 and movement of the trigger arm 3, 103 may be carried out by the attractive action of the latching solenoid 28,128. In this case the assist cam for the trigger arm 35, 135 is unnecessary. Further the operation of the latching solenoids 28 and 128 can be effected satisfactorily only by feeding them with constant pulses at a timing, where movement of the trigger arms 3 and 103 is required, respectively.

As clearly seen from the above explanation, in the tape recorder according to the present invention, the operation of the latching solenoids is used merely as a trigger. The control of the movement of the member for switching-over the fast forward and the rewinding modes as well as the control of the head base plate are effected by repeated driving of the latching solenoid in the course of the switching-over from the stop mode to the play mode. In addition the selective setting of the fast forward mode, the rewinding mode and the play mode is effected by differences in the driving timing of the latching solenoids described above. The time of the feeding of the latching solenoids at switching-over the different modes can be constant for all the modes so that it is possible to simplify the software program therefor. Further, since latching solenoids can be used for the mode switching mechanism, current consumption by the latching solenoids is small and therefore the size and the weight of the power supply can be reduced for the main body of a telephone apparatus. It is possible also to suppress metallic sounds. Still further, since the operation of the latching solenoid is used merely as a trigger, and operations such as the mode switching, etc. are effected by assist cams, there are no problems in the stroke and the attractive force.

Further, since the different modes are directly changed, by which they are switched-over after having once passed through the STOP mode, the reliability of the mode change can be increased.

What is claimed is:

1. A tape recorder having a plurality of selectable modes of operation, comprising:
    a normally de-energized latch-type solenoid;
    a pivotally mounted trigger arm having a first end portion;
    means holding said first end portion of said trigger arm in a first position adjacent said solenoid when the solenoid is deenergized;
    spring means connected to said trigger arm to urge said first end portion away from said solenoid, energization of said solenoid releasing said first end portion of said trigger arm to enable said spring means to cause said trigger arm to pivot;
    an assist gear rotatably mounted adjacent a second end of said trigger arm, said assist gear having first, second and third cam portions, said first cam portion displacing a movable head base plate on which is mounted a magnetic head, said second cam portion displacing a first, rotatably-mounted mode selection lever to positions corresponding to selected modes of operation of the tape recorder, and said third cam portion engaging and pivoting said trigger arm to return said first end portion to said first position;
    a drive gear mounted for rotation;
    motor means connected to said drive gear for rotating said drive gear;
    means responsive to the pivotal motion of said trigger arm for selectively engaging said assist gear with said drive gear, whereby the rotation of said assist gear is controlled by said trigger arm;
    a rotatably-mounted second lever rotating in cooperation with said first lever by an amount greater than the rotation of said first lever and including an engaging portion which is engageable with said trigger arm,
    an elastic body mounted to hold said second lever in a neutral position;
    a mode switching gear mounted on said second lever, rotation of said second lever moving said mode switching gear between a plurality of positions corresponding to selected modes of operation; and
    means for rotating said second lever to selected ones of said plurality of positions, the energization of said solenoid by a first pulse releasing said trigger arm to cause said assist gear to rotate, the rotation of said assist gear displacing said first lever to a p redetermined mode selecting position, subsequent energization of said solenoid by a second pulse releasing said trigger arm again to cause said second lever to engage said trigger arm and to rotate said second lever to move said mode switching gear to a selected one of said plurality of positions.

2. A tape recorder according to claim 1, wherein said means holding said first end portion of said trigger arm in said first position comprises magnetic means on said trigger arm disposed to engage said solenoid, said magnet means being disengaged from said solenoid upon energization of the solenoid.

* * * * *